(12) United States Patent
Unna (10) Patent No.: US 10,280,979 B2
(45) Date of Patent: May 7, 2019

(54) RETAINING ELEMENT, ASSEMBLY AND METHOD

(71) Applicant: ROLLS-ROYCE plc, London (GB)

(72) Inventor: Toby E Unna, Derby (GB)

(73) Assignee: ROLLS-ROYCE plc, London (GB)

( * ) Notice: Subject to any disclaimer, the term of this patent is extended or adjusted under 35 U.S.C. 154(b) by 101 days.

(21) Appl. No.: 15/471,407

(22) Filed: Mar. 28, 2017

(65) Prior Publication Data

US 2017/0284472 A1    Oct. 5, 2017

(30) Foreign Application Priority Data

Apr. 5, 2016 (GB) .................................. 1605776.2

(51) Int. Cl.
*F16C 35/067* (2006.01)

(52) U.S. Cl.
CPC ........ *F16C 35/067* (2013.01); *F16C 2226/00* (2013.01); *F16C 2226/70* (2013.01); *F16C 2240/60* (2013.01); *F16C 2326/43* (2013.01)

(58) Field of Classification Search
CPC .......... F02C 7/06; F16C 35/02; F16C 35/067; F16C 2226/00; F16C 2326/43
See application file for complete search history.

(56) References Cited

U.S. PATENT DOCUMENTS

| | | | | |
|---|---|---|---|---|
| 5,080,501 | A * | 1/1992 | Siebert | F16C 35/067 384/439 |
| 9,222,518 | B2 * | 12/2015 | Beyfuss | F16C 35/077 |
| 9,656,685 | B2 * | 5/2017 | Iwakawa | F16C 35/07 |
| 9,903,416 | B2 * | 2/2018 | Ishibashi | F16C 35/067 |
| 10,001,174 | B2 * | 6/2018 | Ishibashi | F16C 35/067 |
| 10,030,758 | B2 * | 7/2018 | Basile | F16C 19/16 |
| 2016/0348575 | A1 * | 12/2016 | Martens | F04D 29/462 |
| 2017/0114829 | A1 * | 4/2017 | Ishibashi | F16C 35/067 |
| 2017/0204910 | A1 * | 7/2017 | Demeulenaere | F16C 35/00 |

FOREIGN PATENT DOCUMENTS

JP    S52-120259 U    9/1977

OTHER PUBLICATIONS

Sep. 1, 2016 Search Report issued in Great Britain Patent Application No. GB1605776.2.

* cited by examiner

*Primary Examiner* — Bradley Duckworth
(74) *Attorney, Agent, or Firm* — Oliff PLC (57) ABSTRACT

A retaining element for retaining a component within a receiving part, the retaining element including: a neck portion to be received within a notch formed in the receiving part; a first head portion coupled to the neck portion end and defining a first shoulder; a second head portion coupled to another neck portion end and defining a second shoulder, wherein the first and second shoulders oppose one another and are to abut first and second surfaces of the receiving part so as to engage the retaining element with the receiving part; wherein the first and/or second head portions include a retaining tab having a retaining surface, wherein the retaining tab has a receiving position for receiving the component and retaining position for retaining the component; wherein, in the retaining position, the retaining tab extends beyond the neck portion so the retaining surface abuts the component surface to retain the component.

19 Claims, 11 Drawing Sheets

RETAINING ELEMENT, ASSEMBLY AND METHOD

The disclosure relates to a retaining element, assembly and method.

Bearings are used in applications where relative rotation is required between two parts. It is important in many applications that the placement of the bearing is accurate to allow smooth rotation with as little friction and wear as possible. The current practice for retaining a bearing includes providing a cylindrical holder which can receive the bearing, with inward radial flanges on one end to retain the bearing in the holder and outward radial flanges on the other end which are attached to the plate by means of screws or bolts. However, the outward flanges on these holders can be bulky and in some applications, the holder may require too much space and impinge on space required by adjacent components. This may be the case in systems such as an aircraft engine, where space may be very limited.

In addition, when using these holders the accuracy of the placement of the bearing is determined by how well the bearing fits into the holder and the precision with which the holes are drilled and tapped in both the plate and the holder. This is an expensive and time consuming process to do accurately and this build-up of tolerances in each step may result in inaccurate placement of the bearing.

Similar issues may also exist in other situations where a component is retained within a receiving part.

It is therefore desirable to provide a means for retaining a component within a receiving part which addresses some or all of the issues described above.

In accordance with an aspect, there is provided a retaining element for retaining a component within a receiving part, the retaining element comprising: a neck portion configured to be received within a notch formed in the receiving part; a first head portion coupled to an end of the neck portion and defining a first shoulder, a second head portion coupled to another end of the neck portion and defining a second shoulder, wherein the first and second shoulders oppose one another and are configured to abut first and second surfaces of the receiving part so as to engage the retaining element with the receiving part; wherein the first and/or second head portions comprise a retaining tab having a retaining surface, wherein the retaining tab has a receiving position for receiving the component and a retaining position for retaining the component; wherein, in the retaining position, the retaining tab extends beyond the neck portion such that the retaining surface abuts a surface of the component to retain the component.

The retaining surface of the first and/or second head portion may be aligned with the corresponding shoulder.

The retaining surface of the first and/or second head portion may be offset from the corresponding shoulder.

The or each retaining tab may be deformable between the receiving position and the retaining position.

The or each retaining tab may be rotatable relative to the neck portion.

The or each retaining tab may be twistable relative to the neck portion.

The head portion may be rotatable relative to the neck portion to move the retaining tab between the receiving position and the retaining position.

The first and second head portions may comprise retaining tabs which extend in opposite lateral directions when in the receiving position.

The first and second shoulders may each comprise a pair of shoulder portions which project laterally beyond either side of the neck portion.

One of the shoulder portions may be formed by the retaining tab when in the receiving position.

The retaining element may be planar when the retaining tabs are in the receiving position and the retaining tabs may extend out of the plane when in the retaining position.

In accordance with another aspect, there is provided a retaining assembly comprising: a plurality of retaining elements as described above; a receiving part comprising an aperture for receiving a component; wherein a plurality of notches are formed in the aperture for receiving the retaining elements such that the retaining elements are disposed between the component and the receiving part so as to retain the component within the receiving part.

The notches in the receiving part may have dimensions which correspond to dimensions of the neck portion.

In accordance with another aspect, there is provided a method of retaining a component within a receiving part, the method comprising: inserting a plurality of retaining elements as described above, with the or each retaining tab in the receiving position, into a plurality of notches formed in an aperture of the receiving part such that the first and second shoulders of each retaining element abut first and second surfaces of the receiving part; inserting the component into the aperture of the receiving part such that the retaining elements are disposed between the component and the receiving part; moving the or each retaining tab from the receiving position to the retaining position such that the retaining surface abuts a surface of the component thereby retaining the component within the receiving part.

The invention may comprise any combination of the features and/or limitations referred to herein, except combinations of such features as are mutually exclusive.

For a better understanding of the disclosure, and to show more clearly how it may be carried into effect, reference will now be made, by way of example, to the accompanying drawings, in which:—

Figure 1:
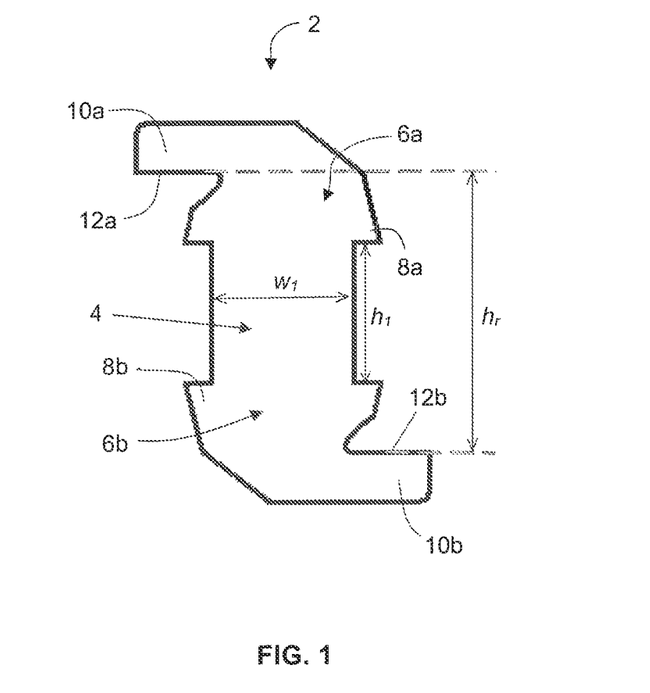
FIG. 1 is a front view of a first example of a retaining element.

FIG. 1 shows a retaining element 2 according to a first example. The retaining element 2 comprises a neck portion 4. A first head portion 6a is disposed at one end of the neck portion 4 and a second head portion 6b is disposed at the opposite end of the neck portion 4. The head portions 6a, 6b are wider than the neck portion 4 and project laterally from the neck portion 4 to form a pair of upper shoulders 8a and a pair of lower shoulders 8b. The neck portion 4 has a width $w_1$, a height $h_1$ (corresponding to the spacing between the upper and lower shoulders 8a, 8b) and a thickness $t_1$. A deformable retaining tab 10a, 10b is coupled to a distal end of each head portion 6a, 6b and projects laterally to one side of the retaining element 2. The retaining tabs 10a, 10b lie in the plane of the neck portion 4 and extend in opposite lateral directions. The retaining tabs 10a, 10b each define a retaining surface 12a, 12b which oppose one another. The retaining surfaces 12a, 12b are spaced from one another by a distance $h_r$ which corresponds to the height $h_1$ of the neck portion 4 plus the height of the head portions 6a, 6b.

The retaining element 2 is cut out of a sheet of material having the thickness $t_1$. For example, the retaining element 2 may be cut from the sheet using a laser.

Figure 2:
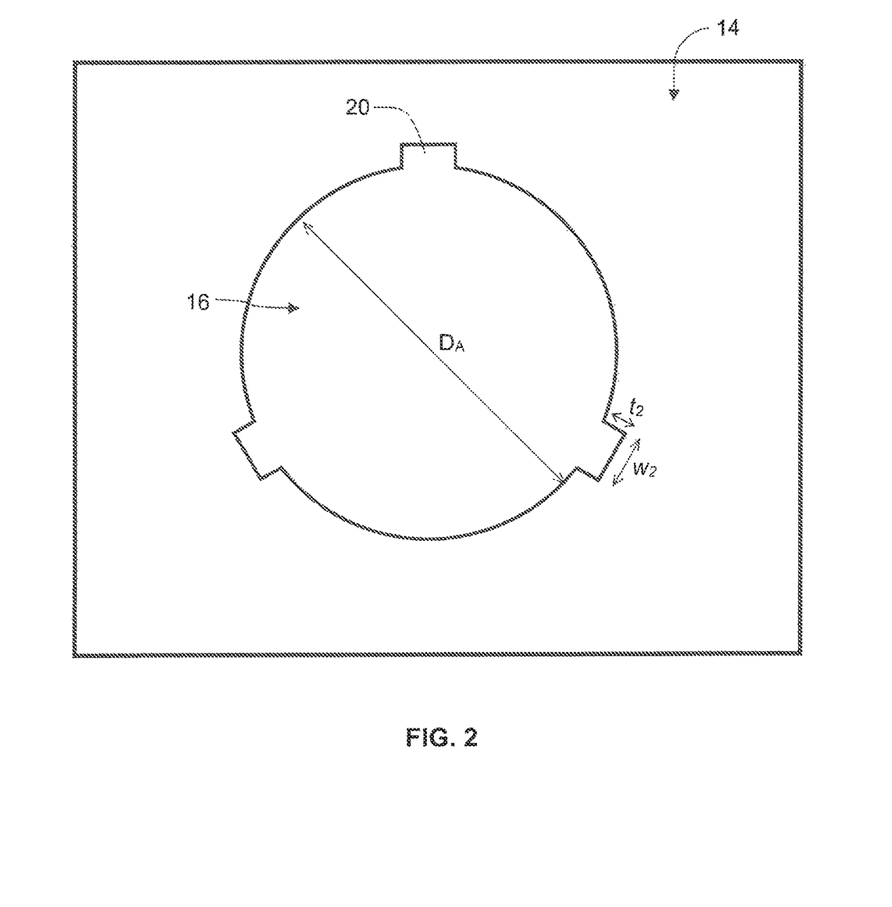
FIG. 2 is a top view of a plate configured for use with the retaining element of FIG. 1.

FIG. 2 shows a plate 14 configured to be used with the retaining element 2. The plate 14 comprises a circular aperture 16 which is sized to receive a bearing 18 (see FIG. 3). Accordingly, the diameter $D_A$ of the aperture 16 is approximately equal to the outer diameter $D_B$ of the bearing 18 such that the bearing 18 fits snuggly into the aperture 16.

The generally circular aperture 16 is interrupted by a plurality of rectangular indentations or notches 20 which extend radially outwardly. The notches 20 are spaced equally around the circumference of the circular aperture 16. In the example shown, three notches 20 are used such that the notches 20 are spaced at 120 degree intervals.

The notches 20 have a width $w_2$ which corresponds to the width $w_1$ of the neck portion 4. The notches 20 also have a thickness (i.e. the radial depth) $t_2$ defined by the thickness of the plate 14 which corresponds to the thickness $t_1$ of the retaining element 2. The height $h_2$ (i.e. the axial thickness) of the notches (defined by the thickness of the plate 14) corresponds to the height $h_1$ of the neck portion 4.

Figure 3:
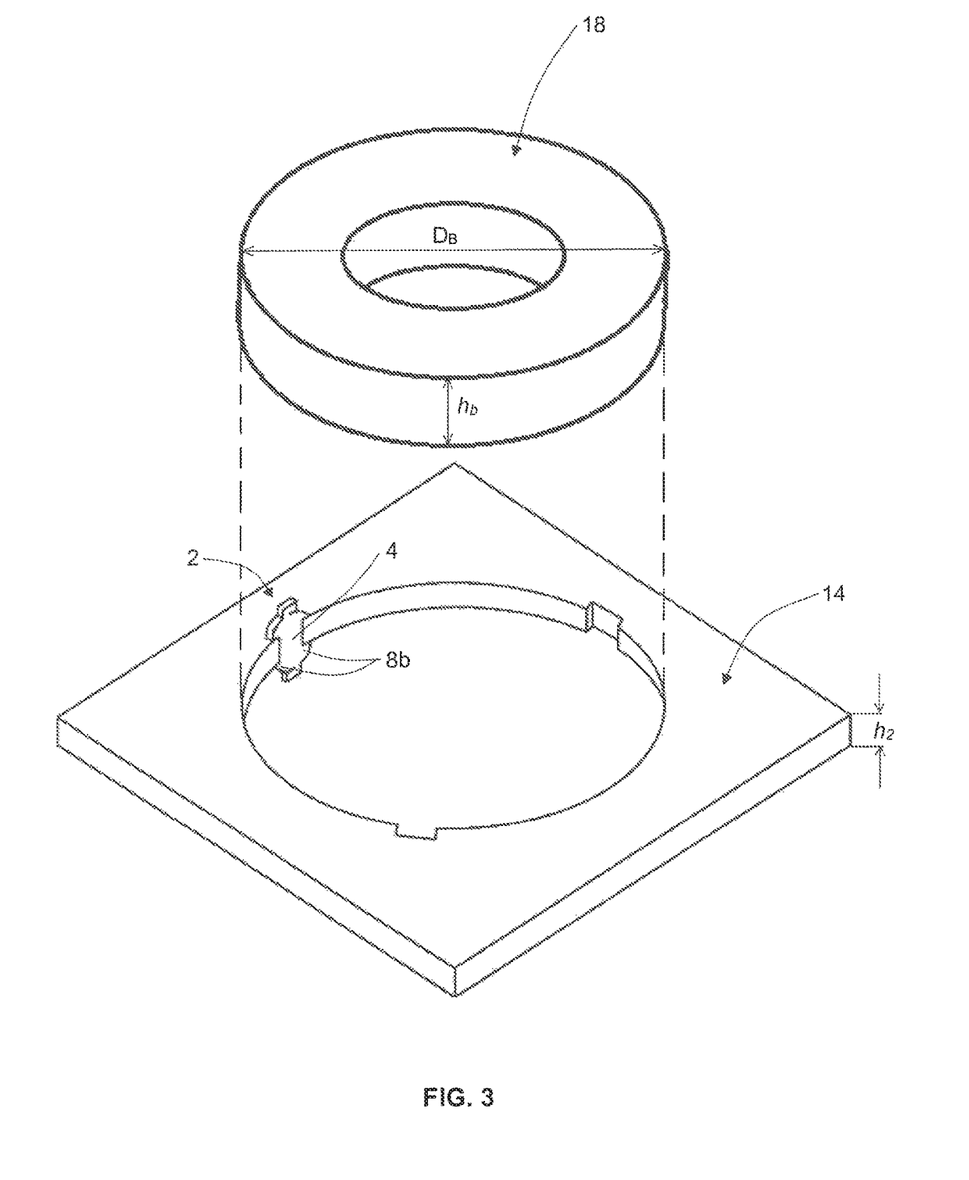
FIG. 3 is a perspective view showing a first stage of affixing a bearing to the plate of FIG. 2.

As shown in FIG. 3, each of the notches 20 receives a retaining element 2 (only one is shown). The retaining element 2 is inserted radially into the notch 20 with the neck portion 4 received by the notch 20 and the head portions 6a, 6b respectively positioned above and below the surface of the plate 14. As described above, the dimensions of the notches 20 correspond to the dimensions of the neck portion 4. Accordingly, the neck portion 4 is received entirely within the notch 20, with the upper and lower shoulders 8a, 8b abutting the adjacent upper and lower surfaces of the plate 14. The upper and lower shoulders 8a, 8b therefore prevent axial movement of the retaining element 2 relative to the plate 14. The radially inner surface of the neck portion 4 thus generally forms a continuation of the radial surface defining the aperture 16. However, the retaining element 2 may be planar (particularly where the retaining element 2 is cut from a planar sheet) such that the radially inner surface of the neck portion 4 does not precisely follow the curvature of the aperture 16.

The bearing 18 is inserted into the aperture 16. In this position, the outer surface of the bearing 18 prevents radial movement the retaining elements 2 towards the centre of the aperture 16 and thus prevents the retaining elements 2 from being removed from the notches 20. The retaining elements 2 are therefore fixed relative to the plate 14.

The height $h_b$ (i.e. the axial thickness) of the bearing 18 corresponds to the height $h_r$ between the retaining surfaces 12a, 12b. The bearing 18 can therefore be received at an axial position which is between the positions of the retaining tabs 10a, 10b.

Figure 4:
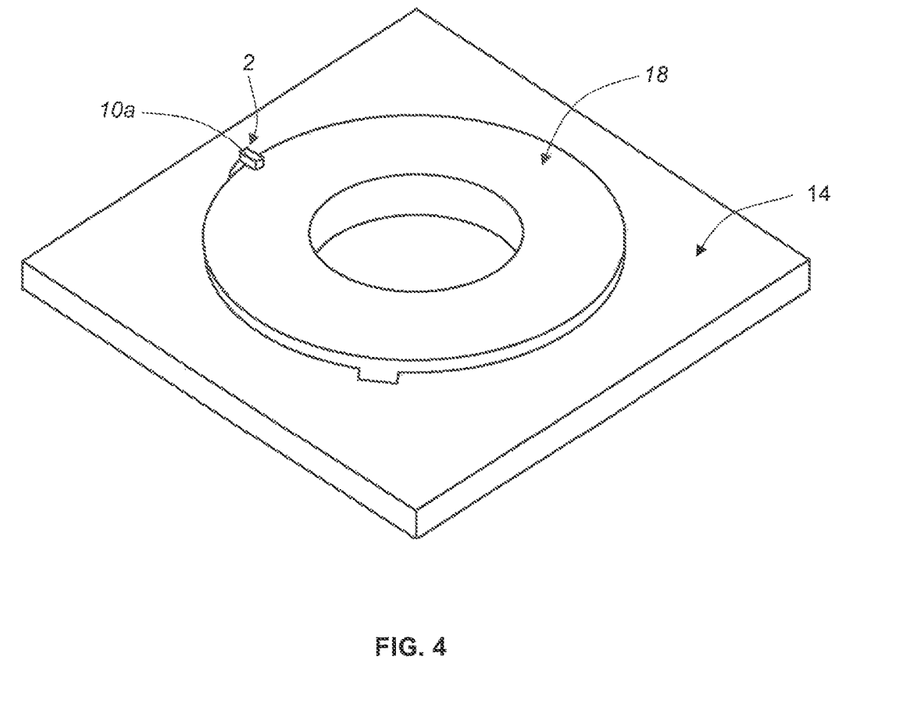
FIG. 4 is a perspective view showing the bearing retained within the plate.
Figure 5:
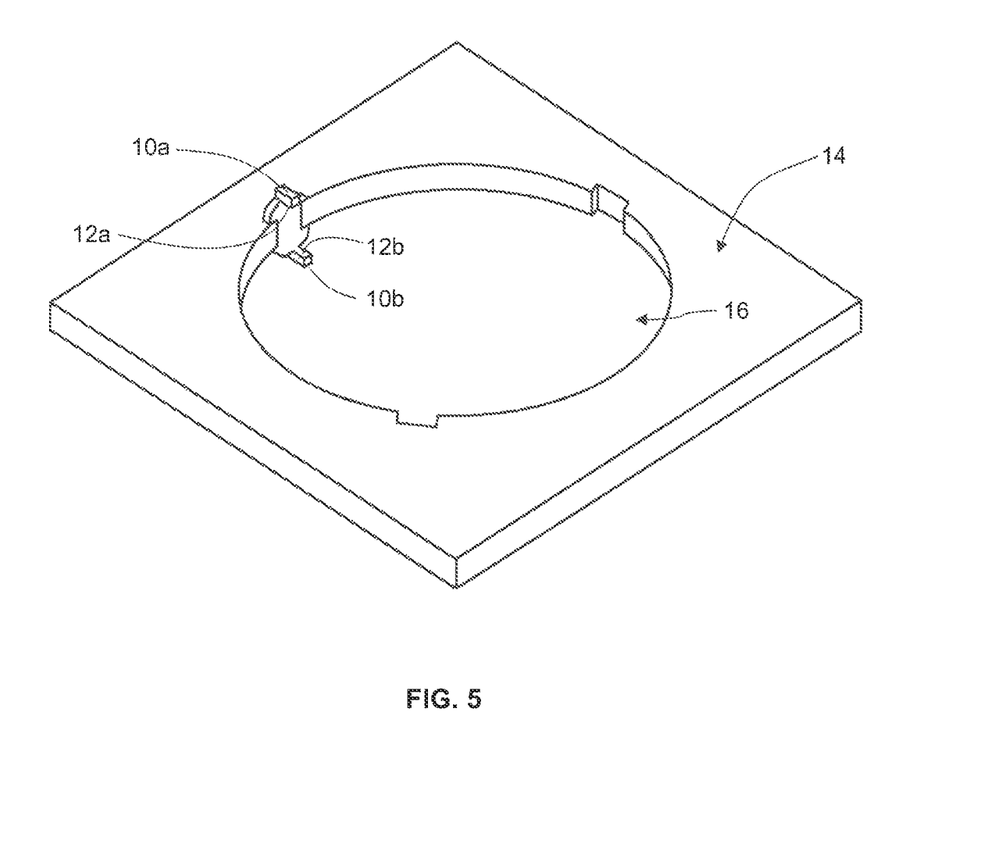
FIG. 5 corresponds to FIG. 4, but with the bearing removed for clarity.

As shown in FIGS. 4 and 5, the retaining tabs 10a, 10b can be deformed from a receiving position where they lie in the plane of the neck portion 4 towards a retaining position where they are angled relative to the neck portion 4 and thus project over the aperture 16. Consequently, the retaining tabs 10a, 10b overlap the bearing 18 with the retaining surfaces 12a, 12b abutting the upper and lower surfaces of the bearing 18. The retaining element 2 therefore prevents axial movement of the bearing 18 and thus affixes the bearing 18 to the plate 14.

The retaining tabs 10a, 10b need only be twisted sufficiently to overlap the bearing 18 and thus need not be bent through 90 degrees as shown. It is desirable that the retaining tabs 10a, 10b are only twisted within their plastic deformation range so that the retaining tabs 10a, 10b can be bent back to the receiving position to release the bearing 18 and then subsequently reused. The retaining element 2 therefore permits assembly, disassembly and reassembly.

Figure 6:
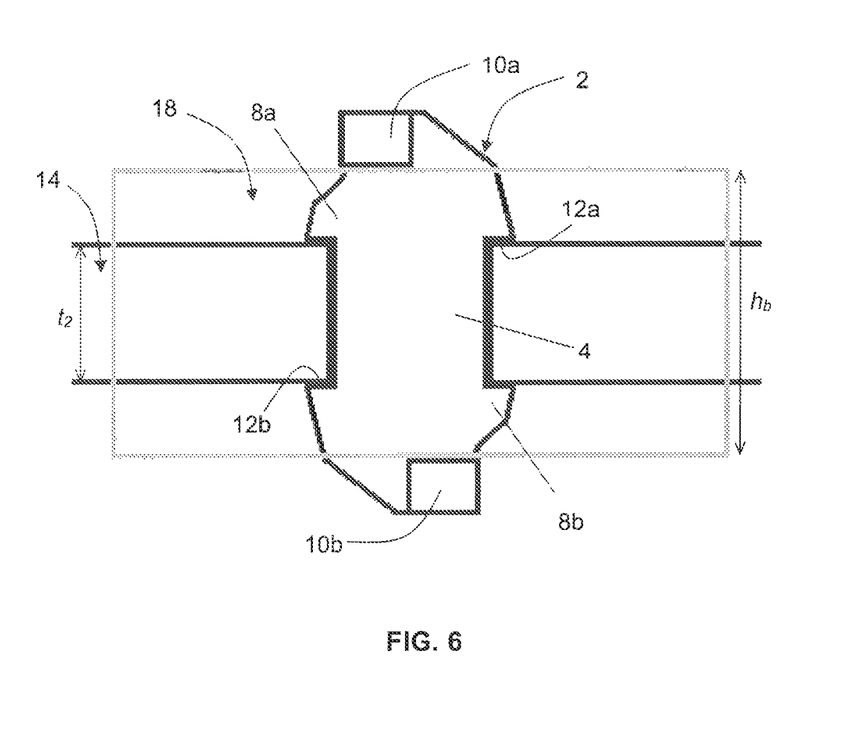
FIG. 6 is a cross-sectional side view showing the bearing retained within the plate using the retaining element of FIG. 1.

As shown in FIG. 6, the height $h_b$ of the bearing 18 is greater than the thickness $t_2$ of the plate 14. Owing to the head portions 6a, 6b which separate the shoulders 8a, 8b from the retaining surfaces 12a, 12b, the upper and lower surfaces of the bearing 18 project above the upper and lower surfaces of the plate 14. In the example shown, the head portions 6a, 6b have equal dimensions such that the upper surface of the bearing 18 projects above the upper surface of the plate 14 by the same distance as the lower surface of the bearing 18 projects below the lower surface of the plate 14. However, it will be appreciated that the dimensions of the head portions 6a, 6b can be configured to position the bearing 18 in any desired axial position relative to the plate 14. Further, the retaining tab(s) 10a, 10b can be positioned such that the retaining surface(s) 12a, 12b are level with the shoulders 8a, 8b.

Figure 7:
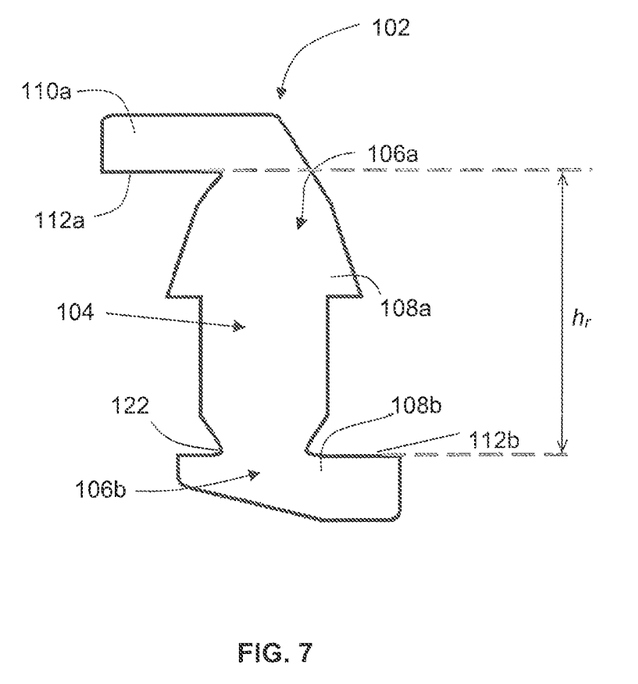
FIG. 7 is a front view of a second example of a retaining element.

For example, FIG. 7 shows a retaining element 102 according to a second example which is configured to hold the bearing 18 so that its lower surface is level with the lower surface of the plate 14 (or, when used in an inverted position, the upper surface is level with the upper surface of the plate 14). The retaining element 102 again comprises a neck portion 104, a first head portion 106a disposed at one end of the neck portion 104 and a second head portion 106b disposed at the opposite end of the neck portion 104. A deformable retaining tab 110a is coupled to the distal end of the upper head portion 106a and extends laterally to one side of the retaining element 102. However, in this example, the lower head portion 106b forms the lower retaining tab. The retaining surface 112b thus forms one of the shoulders 108b. The upper head portion 106a is, however, taller to maintain the separation $h_r$ between the upper and lower shoulders 108a, 108b which corresponds to the height of the bearing $h_b$. The neck portion 104 may comprise a tapered (neck) section 122 adjacent the second head portion 106b which allows the second head portion 106b to be twisted relative to the neck portion 104.

As described for the retaining element 2, the retaining element 102 is inserted radially into the notch 20 with the neck portion 104 received by the notch 20 and the head portions 106a, 106b respectively positioned above and below the surface of the plate 14. The dimensions of the notches 20 correspond to the dimensions of the neck portion 104. Accordingly, the neck portion 104 is received entirely within the notch 20. The upper shoulders 108a abut the adjacent upper surface of plate 14 and the lower shoulders 108b formed in part by the retaining surface 112b abut the lower surface of the plate 14. The upper and lower shoulders 108a, 108b therefore prevent axial movement of the retaining element 2 relative to the plate 14.

Figure 8:
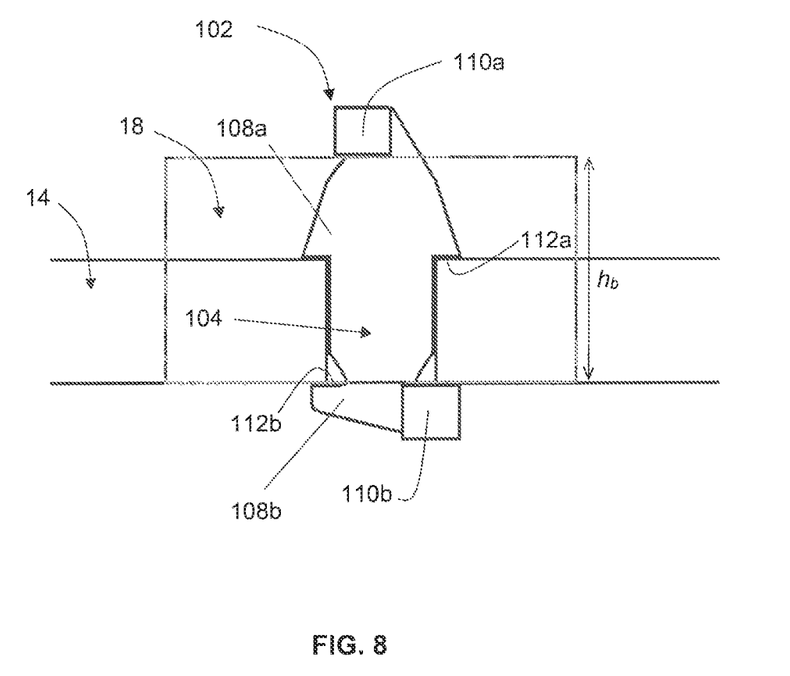
FIG. 8 is a cross-sectional side view showing a bearing retained using the retaining element of FIG. 7.

As shown in FIG. 8, with the bearing 18 positioned in the aperture 16, the upper retaining tab 110a and the lower retaining tab formed by the head portion 106b can be deformed from a receiving position where they lie in the plane of the neck portion 104 towards a retaining position where they are angled relative to the neck portion 104 so that the retaining surfaces 112a, 112b abut the upper and lower surfaces of the bearing 18 and thus affix the bearing 18 to the plate 14. As the lower retaining surface 112b is level with the lower shoulders 108b, the lower surface of the bearing 18 is held flush with the lower surface of the plate 14.

As described previously, the entire head portion 106b may be twisted such that part of the head portion 106b (the retaining tab) rotates towards the centre of the aperture 16 and part of the head portion 106b rotates away from the centre of the aperture.

Figure 9:
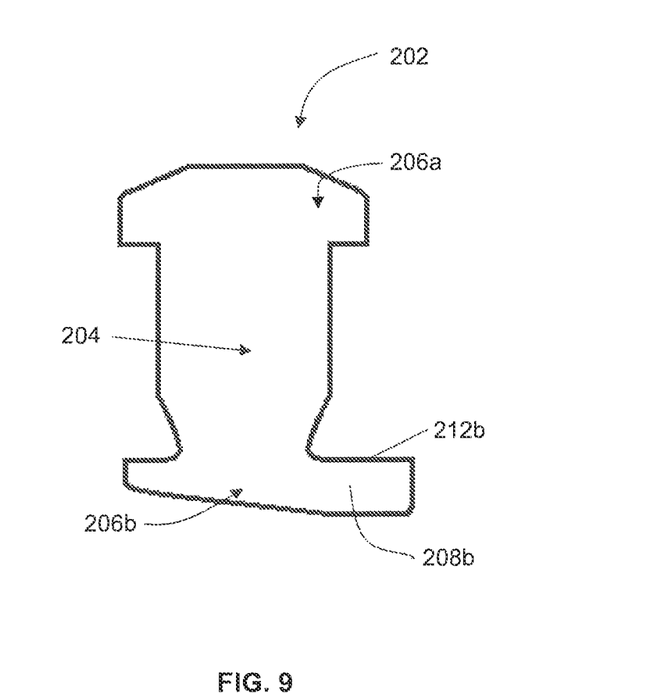
FIG. 9 is a front view of a third example of a retaining element.
Figure 10:
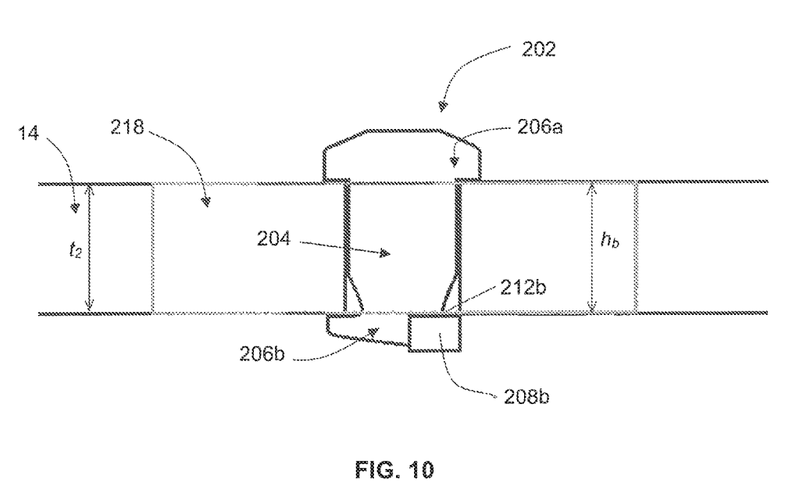
FIG. 10 is a cross-sectional side view showing a bearing retained using the retaining element of FIG. 9.

In other applications, the bearing 18 may only need to be supported by the retaining element from one side. For example, the bearing may receive a shaft or the like which retains the bearing 18 from the other side. The bearing 18 itself may also comprise a lip or the like which retains the bearing 18 in one direction. A retaining element 202 as shown in FIG. 9 may be used in such applications. The retaining element 202 again comprises a neck portion 204, a first head portion 206a disposed at one end of the neck portion 204 and a second head portion 206b disposed at the opposite end of the neck portion 204. With this retaining element 202, only the lower head portion 206b forms or comprises a retaining tab and the upper head portion 206a is not provided with a retaining tab. In the example shown, the lower head portion 206b corresponds to the lower head portion 106b of the retaining element 102 described previously, such that the lower head portion 206b forms the lower retaining tab and the retaining surface 212b thus forms one of the shoulders 208b. The retaining element 202 thus retains the bearing 218 such that its lower surface is flush with the lower surface of the plate 14. As shown in FIG. 10, the height $h_b$ of the bearing 218 corresponds to the thickness of the plate and thus the height $h_2$ of the notches such that the upper surface is also flush with the upper surface of the plate 14. The bearing may instead project above the upper surface of the plate 14, if required, or indeed sit below the upper surface of the plate 14.

Figure 11:
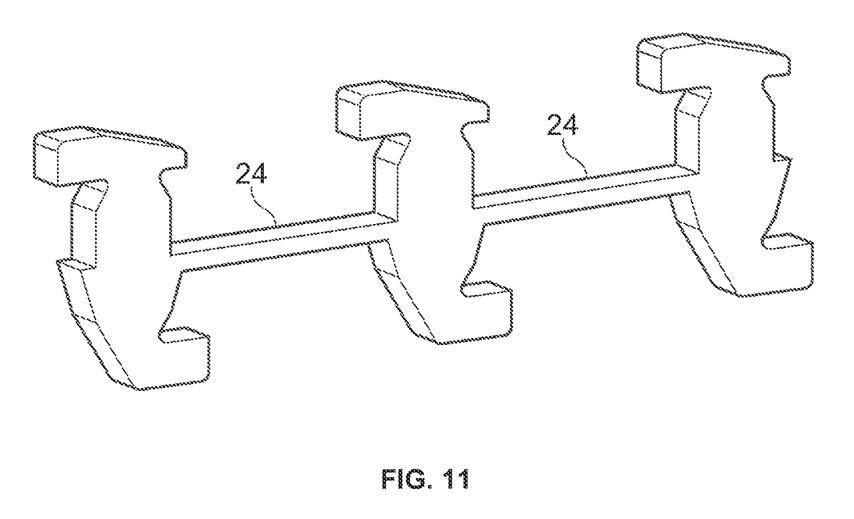
FIG. 11 is a perspective view of a plurality of joined retaining elements.

As shown in FIG. 11, the retaining elements (the retaining elements 102 are shown, but they may instead have the profile of the retaining elements 2, 202) may be connected to one another via connecting rails 24. The connecting rails 24 have a length which corresponds to the spacing between the notches 20. The connecting rails 24 form an extension between adjacent upper and/or lower shoulders of the retaining elements and thus the connecting rails 24 contact the upper and/or lower surface of the plate 14 between the notches 20. The connecting rails 24 may, however, be offset from the shoulders so that they do not contact the plate 14, if desired. This arrangement may be particularly useful for non-circular apertures (e.g. rectangular apertures) where a plurality of retaining elements are used along a straight edge. The connecting rails 24 may also be sufficiently flexible that they can be deformed such that a string of retaining elements can be coiled before installation into a circular aperture and, when release, will spring back out and into place.

A unique tool may be used to accomplish deformation of the retaining tabs in a reliable and repeatable way. This might take the form of a simple tool cut from a single, planar sheet of material with an aperture at one end to accept the retaining tab. The tool may be produced by the same method and at the same time as the other parts.

The retaining elements described previously may conveniently be cut from a sheet of material (e.g. metal) using a laser. The retaining elements can therefore be quickly and accurately manufactured. Similarly, the aperture and/or notches of the plate can be laser cut to tight tolerances. However, other techniques may be used. For example, the retaining elements, aperture and/or notches may be formed by electrical discharge machining (EDM), wire EDM, water jet, laser ablation, micro-machining, grinding, etc. Alternatively, they may be made using additive methods such as laser material addition, electron beam melting, blown powder material addition, wire fed material addition or diffusion bonding.

As the bearing is introduced from one side, it will be appreciated that the opposing retaining tab may be deformed prior to insertion of the bearing. The retaining tab thus prevents the bearing from passing entirely through the aperture and supports the bearing while the other retaining tab (where used) is deformed into the retaining position. With this arrangement, the retaining tab thus does not in fact need to be deformable and could instead be fixed in the retaining position.

Although the shoulders have been described as extending laterally, it will be appreciated that a shoulder may be formed which is perpendicular to this such that it extends radially (or at least with a radial component) over the surface of the plate to prevent axial movement of the retaining element along the notch. A single shoulder may be used at the upper and lower positions.

In the foregoing description, certain dimensions have been described as corresponding to other dimensions. It will be appreciated that the corresponding dimensions must be slightly different in order to permit the described interaction between the elements. For example, the height $h_r$ between the retaining surfaces 12a, 12b must be slightly greater than the height $h_b$ of the bearing 18 in order to be able to accommodate the bearing 18. Therefore, the term "corresponding" should be interpreted accordingly.

Although the retaining tabs have been described as being twisted relative to the neck portion, it will be appreciated that the retaining tabs may instead be brought into contact with the adjacent surface of the bearing by bending over the retaining tab towards the plane of the plate. In such an arrangement, the retaining surfaces lie in the same plane when in the receiving position and only oppose one another when they are in the retaining position.

Although the retaining elements have been described as retaining a bearing within a plate, it will be appreciated that they may be used to retain any component within a receiving part.

The invention claimed is:

1. A retaining element for retaining a bearing within a receiving part, the retaining element comprising:
   a neck portion configured to be received within a notch formed in the receiving part;
   a first head portion coupled to an end of the neck portion and defining a first shoulder; and
   a second head portion coupled to another end of the neck portion and defining a second shoulder,
   wherein:
   the first and second shoulders oppose one another and are configured to abut first and second surfaces of the receiving part so as to engage the retaining element with the receiving part;

the first and/or second head portions comprise a retaining tab having a retaining surface, the retaining tab has a receiving position for receiving the bearing and a retaining position for retaining the bearing; and in the retaining position, the retaining tab extends beyond the neck portion such that the retaining surface abuts a surface of the bearing to retain the bearing.

2. The retaining element as claimed in claim 1, wherein the retaining surface of the first and/or second head portion is aligned with the corresponding shoulder.

3. The retaining element as claimed in claim 1, wherein the retaining surface of the first and/or second head portion is offset from the corresponding shoulder.

4. The retaining element as claimed claim 1, wherein the or each retaining tab is deformable between the receiving position and the retaining position.

5. The retaining element as claimed in claim 4, wherein the or each retaining tab is rotatable relative to the neck portion.

6. The retaining element as claimed in claim 5, wherein the or each retaining tab is twistable relative to the neck portion.

7. The retaining element as claimed in claim 5, wherein the head portion is rotatable relative to the neck portion to move the retaining tab between the receiving position and the retaining position.

8. The retaining element as claimed in claim 1, wherein:
the first and second head portions comprise retaining tabs, and
the retaining tabs extend in opposite lateral directions when in the receiving position.

9. The retaining element as claimed in claim 1, wherein the first and second shoulders each comprise a pair of shoulder portions which project laterally beyond either side of the neck portion.

10. The retaining element as claimed in claim 9, wherein one of the shoulder portions is formed by the retaining tab when in the receiving position.

11. The retaining element as claimed in claim 1, wherein:
the retaining element is planar when the retaining tabs are in the receiving position and
the retaining tabs extend out of the plane when in the retaining position.

12. A retaining assembly comprising:
a receiving part comprising an aperture for receiving a bearing; and
a plurality of retaining elements each retaining element having:
a neck portion configured to be received within a notch formed in the receiving part;
a first head portion coupled to an end of the neck portion and defining a first shoulder; and
a second head portion coupled to another end of the neck portion and defining a second shoulder,
wherein:
the first and second shoulders oppose one another and are configured to abut first and second surfaces of the receiving part so as to engage the retaining element with the receiving part;
the first and/or second head portions comprise a retaining tab having a retaining surface,
the retaining tab has a receiving position for receiving the bearing and a retaining position for retaining the bearing;
in the retaining position, the retaining tab extends beyond the neck portion such that the retaining surface abuts a surface of the bearing to retain the bearing; and
a plurality of notches is formed in the aperture for receiving the retaining elements such that the retaining elements are disposed between the bearing and the receiving part so as to retain the bearing within the receiving part.

13. The retaining assembly as claimed in claim 12, wherein the notches in the receiving part have dimensions which correspond to dimensions of the neck portion.

14. The retaining element as claimed in claim 12, wherein the retaining surface of the first and/or second head portion is aligned with the corresponding shoulder.

15. The retaining element as claimed claim 12, wherein the or each retaining tab is deformable between the receiving position and the retaining position.

16. The retaining element as claimed in claim 12, wherein:
the first and second head portions comprise retaining tabs, and
the retaining tabs extend in opposite lateral directions when in the receiving position.

17. The retaining element as claimed in claim 12, wherein the first and second shoulders each comprise a pair of shoulder portions which project laterally beyond either side of the neck portion.

18. The retaining element as claimed in claim 12, wherein:
the retaining element is planar when the retaining tabs are in the receiving position and
the retaining tabs extend out of the plane when in the retaining position.

19. A retaining element for retaining a component within a receiving part, the retaining element comprising:
a neck portion configured to be received within a notch formed in the receiving part;
a first head portion coupled to an end of the neck portion and defining a first shoulder; and
a second head portion coupled to another end of the neck portion and defining a second shoulder,
wherein:
the first and second shoulders oppose one another and are configured to abut first and second surfaces of the receiving part so as to engage the retaining element with the receiving part;
the first and/or second head portions comprise a retaining tab having a retaining surface,
the retaining tab has a receiving position for receiving the component and a retaining position for retaining the component; and
in the retaining position, the retaining tab extends beyond the neck portion such that the retaining surface abuts a surface of the component to retain the component.

* * * * *